United States Patent
Chang et al.

(10) Patent No.: US 9,791,952 B2
(45) Date of Patent: Oct. 17, 2017

(54) TOUCH DISPLAY APPARATUS

(71) Applicant: InnoLux Corporation, Miao-Li County (TW)

(72) Inventors: Chia-Hsiung Chang, Miao-Li County (TW); Yang-Chen Chen, Miao-Li County (TW); Mei-Chun Shih, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 201 days.

(21) Appl. No.: 14/663,879

(22) Filed: Mar. 20, 2015

(65) Prior Publication Data

US 2016/0195966 A1 Jul. 7, 2016

(30) Foreign Application Priority Data

Jan. 7, 2015 (TW) .............................. 104100366 A

(51) Int. Cl.
G06F 3/041 (2006.01)
G06F 3/044 (2006.01)

(52) U.S. Cl.
CPC ............ *G06F 3/0412* (2013.01); *G06F 3/044* (2013.01); *G06F 2203/04112* (2013.01)

(58) Field of Classification Search
CPC ........ G06F 3/041; G06F 3/044; G06F 3/0412; G06F 2203/04112
See application file for complete search history.

(56) References Cited

U.S. PATENT DOCUMENTS

2014/0152580 A1*  6/2014  Weaver ................... G06F 3/041
                                                      345/173
2014/0327842 A1* 11/2014  Tang ....................... G06F 3/044
                                                       349/12
2015/0169109 A1*  6/2015  Park ........................ G06F 3/044
                                                      345/174

FOREIGN PATENT DOCUMENTS

| KR | 10-20110044439 | 4/2011 |
| KR | UM2020120008432 | 12/2012 |
| KR | 10-20140109797 | 9/2014 |
| TW | 201512933 | 4/2015 |
| TW | 201530404 | 8/2015 |
| TW | 201604735 | 2/2016 |
| WO | WO 2015/008933 | 1/2015 |

OTHER PUBLICATIONS

Korean language office action dated Apr. 21, 2016, issued in application No. KR 10-2015-0088552.
English language translation of office action.
Chinese language office action dated Feb. 19, 2016, issued in application No. TW 104100366.

* cited by examiner

*Primary Examiner* — Lun-Yi Lao
*Assistant Examiner* — Johny Lau
(74) *Attorney, Agent, or Firm* — McClure, Qualey & Rodack, LLP

(57) ABSTRACT

Disclosed is a touch display apparatus including a display panel, a substrate and a touch-sensing layer thereon. The substrate is disposed above the display panel and includes a touch-sensing region and a non-touch-sensing region. The touch-sensing layer includes a first trace, and at least a part of the first trace is disposed above the non-touch-sensing region. A mesh pattern is formed on a surface of the first trace.

13 Claims, 5 Drawing Sheets

TOUCH DISPLAY APPARATUS

CROSS REFERENCE TO RELATED APPLICATIONS

This Application claims priority of Taiwan Patent Application No. 104100366, filed on Jan. 7, 2015, the entirety of which is incorporated by reference herein.

BACKGROUND

Technical Field

The disclosure relates to a touch display apparatus, and in particular it relates to the surface of a trace in a touch display apparatus.

Description of the Related Art

A conventional touch-sensing device usually includes sensing electrodes and traces on a touch-sensing substrate, and the traces are electrically connected to the sensing electrodes. The traces can be electrically connected to a bonding pad set, and the bonding pad set can be further electrically connected to an external circuit such as a flexible circuit board. The current or signals can be delivered from the external circuit to the sensing electrodes through the bonding pad set and the traces, thereby driving the touch-sensing device.

However, the conventional traces and protection layer formed thereon (and the touch-sensing substrate underlying the traces) have insufficient adhesion, thereby causing delamination or peeling problems. When the touch-sensing device is integrated with a display device to complete a touch display apparatus, the flat surface of the traces easily reflecting light to give the touch display apparatus has an uneven brightness. Accordingly, a novel standard for the traces for solving above problems is called for.

BRIEF SUMMARY

One embodiment of the disclosure provides a touch display apparatus, comprising: a display panel; a first substrate disposed above the display panel, wherein the first substrate includes a touch-sensing region and a non-touch-sensing region; and a first touch-sensing layer disposed above the first substrate; wherein the first touch-sensing layer includes a first trace, a part of the first trace is disposed above the non-touch-sensing region, and a mesh pattern is formed on a surface of the first trace.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
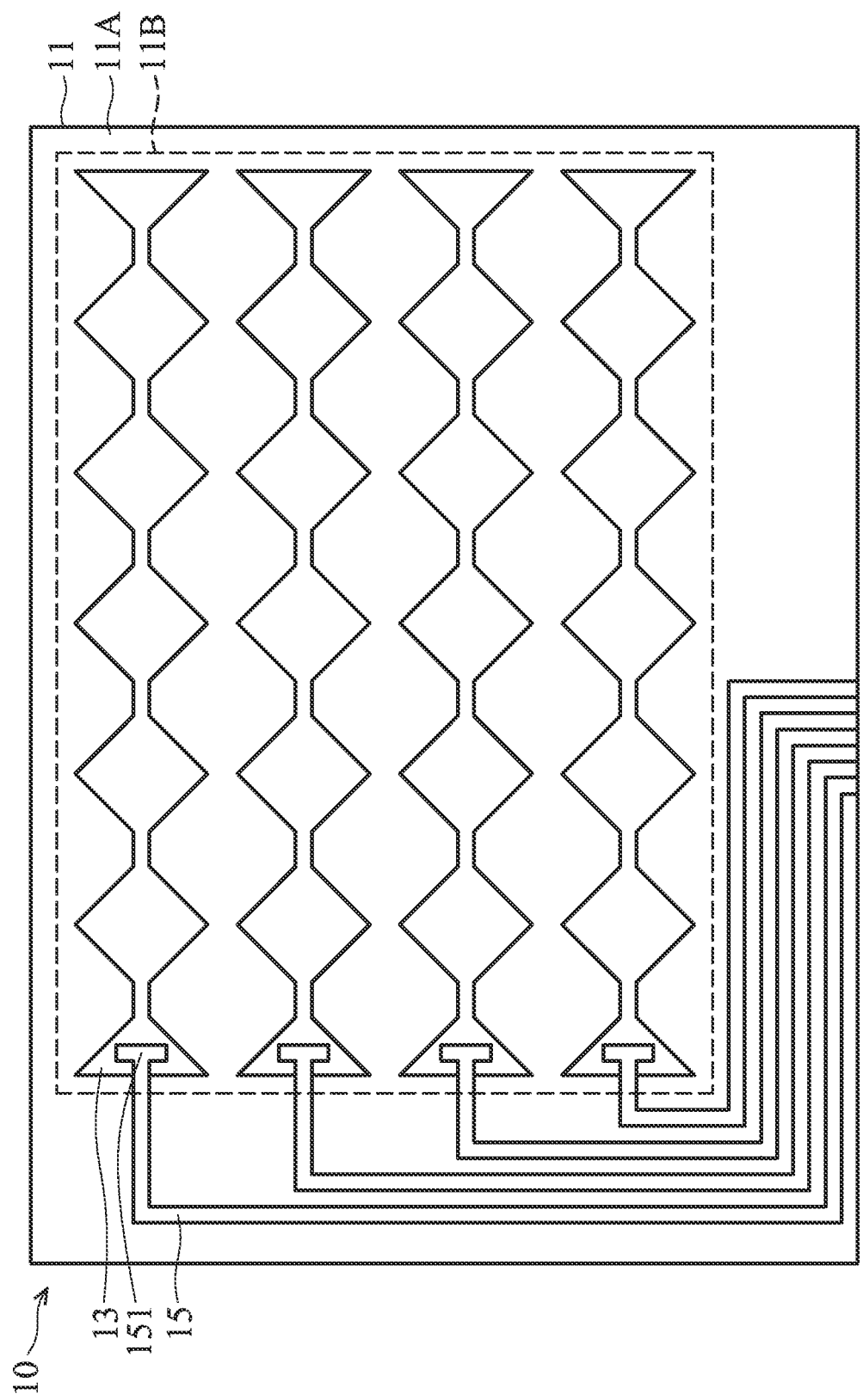
FIG. 1 shows a top view of a touch-sensing device in one embodiment of the disclosure.

FIG. 1 shows a top view of a touch-sensing device 10 in one embodiment of the disclosure. As shown in FIG. 1, the touch-sensing device includes a touch-sensing layer on a substrate 11, and the substrate is divided into a non-touch-sensing region 11A and a touch-sensing region 11B. The touch-sensing layer includes sensing electrodes 13 and traces 15. The sensing electrodes 13 are disposed above the touch-sensing region 11B. A part of the traces 15 is disposed above the non-touch-sensing region 11A, and a part of the traces 15 is disposed above the touch-sensing region 11B to overlap with the sensing electrodes 13. In the embodiment, the non-touch-sensing region 11A surrounds the touch-sensing region 11B, and this embodiment is for illustration only but not for limiting the disclosure. Alternatively, the non-touch-sensing region 11A can be located outside of the touch-sensing region 11B but not surrounding the touch-sensing region 11B. In one embodiment, the substrate 11 is a flexible polymer thin film such as polyethylene terephthalate (PET), polycarbonate (PC), or the like. Although the sensing electrodes 13 in following embodiments and drawings are shaped like a rhombus with the same area and connected by connecting electrodes, it should be understood that the sensing electrodes 13 can be another shape (e.g. triangle, tetragon, hexagon, or another possible shape) with the same or different areas if necessary. In one embodiment, the sensing electrodes 13 and the connecting electrodes therebetween can be made of a transparent conductive material (such as indium tin oxide (ITO) or indium zinc oxide (IZO)) formed by the following steps: depositing a transparent conductive layer, and patterning the transparent conductive layer by lithography and etching to define the sensing electrodes 13 and the connecting electrodes.

In one embodiment, a terminal of one trace 15 is connected to the sensing electrode 13, and an overlapping part of the terminal and the sensing electrode 13 is defined as a connection part 151. Another terminal of the same trace 15 can be connected to a bonding pad (not shown). The bonding pad such as ITO or IZO can be formed overlying or underlying the traces 15, such that the sensing electrode 13 can be electrically connected to an external circuit (not shown) through the traces 15 and the bonding pad (not shown). As such, the external circuit may drive the sensing electrode 13 and receive signals from the sensing electrode 13. The traces 15 can be made of metal such as copper, aluminum, silver, another metal, or an alloy thereof. In one embodiment, the traces 15 can be formed by screen printing, thereby forming a mesh pattern on a surface of the traces 15. Note that the method of forming the traces 15 (e.g. screen printing) is preferably performed on a flexible substrate 11 for forming the mesh pattern on the surface of the traces 15. The mesh pattern on the surface of the traces 15 helps the adhesion between the traces 15 and other layers, thereby avoiding delamination or peeling problems. In addition, the mesh pattern may diffuse the light to prevent uneven brightness on images.

Figure 2:
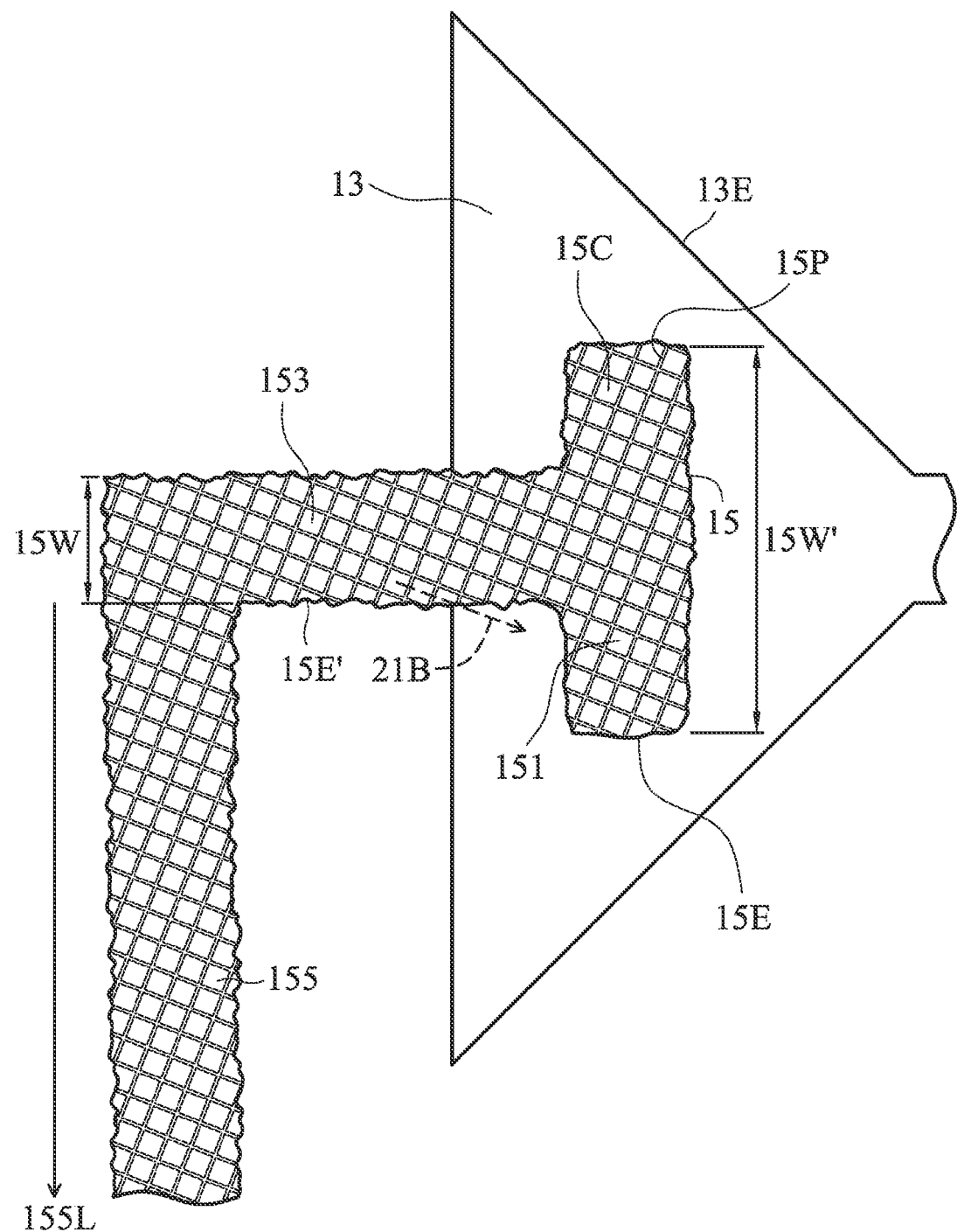
FIG. 2 is an enlarged diagram of a trace in one embodiment of the disclosure.

FIG. 2 shows an enlarged diagram of the trace 15 in FIG. 1. In FIG. 2, the trace 15 has a mesh pattern on its surface. The mesh pattern includes protrusions 15P and concaves 15C, and the protrusions 15P are disposed between the concaves 15C. Although the concaves 15C in FIG. 2 are shaped like a rhombus, they may have other shapes such as circle, ellipse, or polygon such as square, rectangle, pentagon, hexagon, or another polygon. In one embodiment, the total surface of the concaves 15C is greater than the total area of the protrusions 15P, thereby enhancing the light diffusion effect and improving the uniformity of the brightness of the touch display apparatus. The total area of the concaves 15C and the total surface of the traces 15 have a preferred ratio of 55:100 to 90:100, thereby causing a better uniformity of the light.

In detail, the trace 15 includes a body part 155 extending along the length of the trace, a connection part 151 overlapping and contacting the sensing electrode 13, and a neck part 153 connecting the body part 155 and the connection part 151. The neck part 153 extends in a direction that is different from the direction of the length 155L of the body part 155. The connection part 151 has an edge 15E, and the neck part 153 and the body part 155 have an edge 15E'. In other words, the part of the trace 15 not overlapping the sensing electrode 13 has the edge 15E'. The sensing electrode 13 has an edge 13E. In one embodiment, the roughness of the edge 15E' (i.e., roughness of a contact surface at edge 15E') is greater than the roughness of the edge 15E (i.e., roughness of a contact surface at edge 15E), and the roughness of the edge 15E is greater than the roughness of the edge 13E. The roughness of the contact surface at the edge 15E' is greater than the roughness of the contact surface at the edge 15E, thereby enhancing the adhesion between the trace 15 and other layers to avoid delamination or peeling, and roughness of the contact surface at the edge 15E' is greater than the roughness of the contact surface at the edge 15E further helping to diffuse the light and preventing the uneven brightness of the images.

As shown in FIG. 2, the neck part 153 has a width 15W in a direction parallel to the length direction 155L of the trace 15, and the connection part 151 has a width 15W' in a direction parallel to the length direction 155L of the trace 15. In one embodiment, the width 15W' is greater than the width 15W.

In one embodiment, the body part 155 of the trace 15 extends along the length direction 155L, and the protrusions 15P (or the concaves 15C) of the mesh pattern are oriented in direction 21B. In one embodiment, the length direction 155L and direction 21B are different to avoid a Moire effect caused by the mesh pattern and pixels of the underlying display device. Note that the mesh patterns of the two adjacent traces 15 are arranged in the same direction 21B (not shown), such that the light has similar diffusion effect on each of the traces 15. As such, the light can be effectively uniform.

Figure 3:
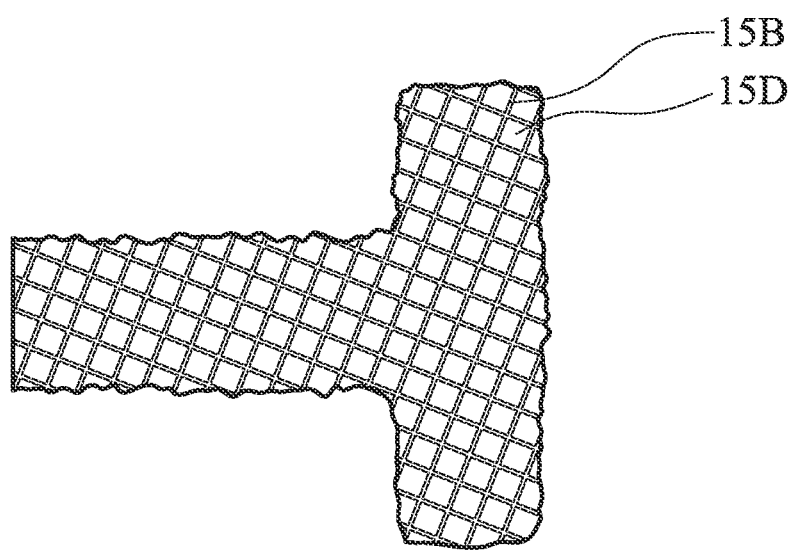
FIG. 3 shows a reflection pattern of the trace corresponding to an incident light.

The touch-sensing device 10 can be integrated with a display device to complete the touch display apparatus. As such, the incident light from the display device exposes the traces 15 to produce a reflection pattern, as shown in FIG. 3. The reflection pattern is divided into bright regions 15B and dark regions 15D, and the bright regions 15B are disposed between the dark regions 15D. In one embodiment, the bright regions 15B correspond to the protrusions 15P of the traces 15, and the dark regions 15D correspond to the concaves 15C. Similarly, the total area of the dark regions 15D is greater than the total area of the bright regions 15B, and the dark regions 15D may have a shape other than the rhombus as shown in FIG. 3, such as circle, ellipse, or polygon (e.g. square, rectangle, pentagon, hexagon, or another polygon).

Figure 4A:
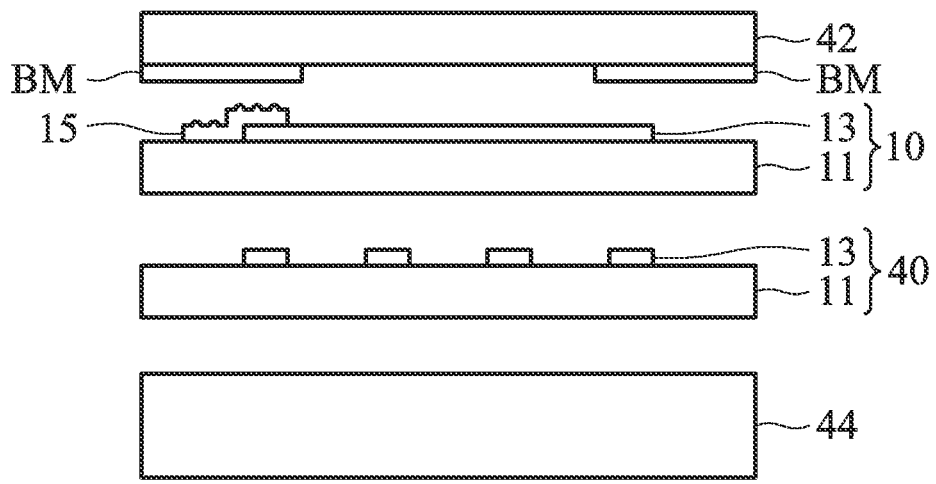
FIG. 4A shows a touch display apparatus in one embodiment of the disclosure.

As shown in FIG. 4A, the touch-sensing device 10 can be collocated with another touch-sensing device 40. In one embodiment, the touch-sensing device 40 may utilize the design of the touch-sensing device 10, with the difference therebetween being the directions in which the sensing electrodes are arranged. For example, the sensing electrodes 13 of the touch-sensing device 40 are arranged in a direction vertical to (or across) the direction in which the sensing electrodes 13 of the touch-sensing device 10 are arranged. Alternatively, the design of the touch-sensing device 40 utilizes another design other than that of the touch-sensing device 10. In another embodiment, the positions of the touch-sensing devices 10 and 40 are opposite to that in FIG. 4A, in which the touch-sensing device 40 is disposed between the touch-sensing device 10 and a cover 42. The touch-sensing devices 10 and 40 can be disposed between the display device 44 and the cover 42 to complete the touch display apparatus. A black matrix BM on the cover 42 corresponds to the traces 15 of the touch-sensing device 10, and the black matrix BM is preferably disposed between the cover 42 and the touch-sensing device 10. For example, the cover 42 can be a glass cover or a plastic cover with a light transmittance greater than 85%. In one embodiment, the display device 44 can be an electronic paper, an electronic reader, an electroluminescent display (ELD), an organic electroluminescent display (OELD), a vacuum fluorescent display (VFD), a light emitting diode display (LED), a cathode ray tube (CRT), a liquid crystal display (LCD), a plasma display panel (PDP), a digital light processing (DLP) display, a liquid crystal on silicon (LCoS), an organic light-emitting diode (OLED), a surface-conduction electron-emitter display (SED), a field emission display (FED), a quantum dot laser TV, a liquid crystal laser TV, a ferro liquid display (FLD), an interferometric modulator display (iMoD), a thick-film dielectric electroluminescent (TDEL), a quantum dot light emitting diode (QD-LED), a telescopic pixel display (TPD), an organic light-emitting transistor (OLET), an electrochromic display, a laser phosphor display (LPD), or the like. The display device 44 is preferably an electroluminescent display (ELD), an organic electroluminescent display (OELD), vacuum fluorescent display (VFD), light emitting diode display (LED), a cathode ray tube (CRT), a liquid crystal display (LCD), a plasma display panel (PDP), an organic light-emitting diode (OLED), a surface-conduction electron-emitter display (SED), a field emission display (FED), an organic light-emitting transistor (OLET), or a laser phosphor display (LPD).

Figure 4B:
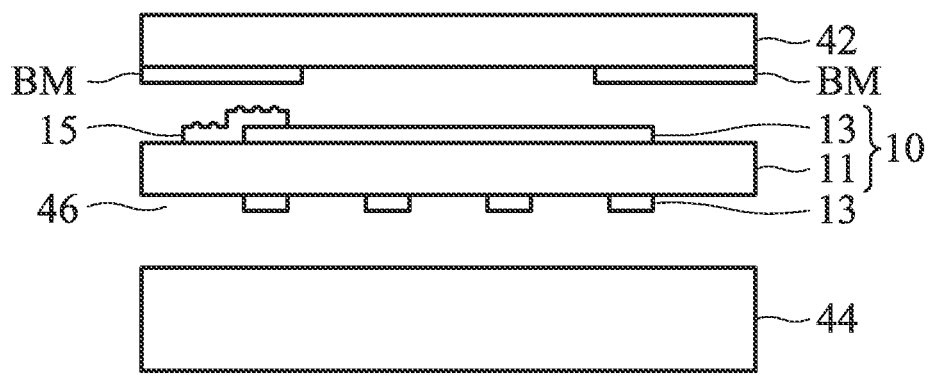
FIG. 4B shows a touch display apparatus in one embodiment of the disclosure.

As shown in FIG. 4B, another touch-sensing layer 46 is formed under the substrate 11 of the touch-sensing device 10. The touch-sensing layer 46 may utilize the design of the touch-sensing layer of the touch-sensing device 10, with the difference therebetween being the directions in which the sensing electrodes 13 are arranged. For example, the sensing electrodes 13 of the touch-sensing layer 46 are arranged in a direction vertical to (or across) the direction in which the sensing electrodes 13 of the touch-sensing device 10 are arranged. Alternatively, the design of the touch-sensing layer 46 utilizes another design other than the shape of the sensing electrodes 13 in the touch-sensing device 10. In another embodiment, the positions of the touch-sensing layer 46 and the touch-sensing layer of the touch-sensing device 10 are opposite to that in FIG. 4B, in which the touch-sensing layer 46 is disposed between the touch-sensing layer of the touch-sensing device 10 and the cover 42. In addition, the touch-sensing layer 46 and the touch-sensing electrodes 13 are coplanar. In the embodiment, the display device 44 is similar to that in a previously described embodiment and the description thereof is omitted here.

Figure 5A:
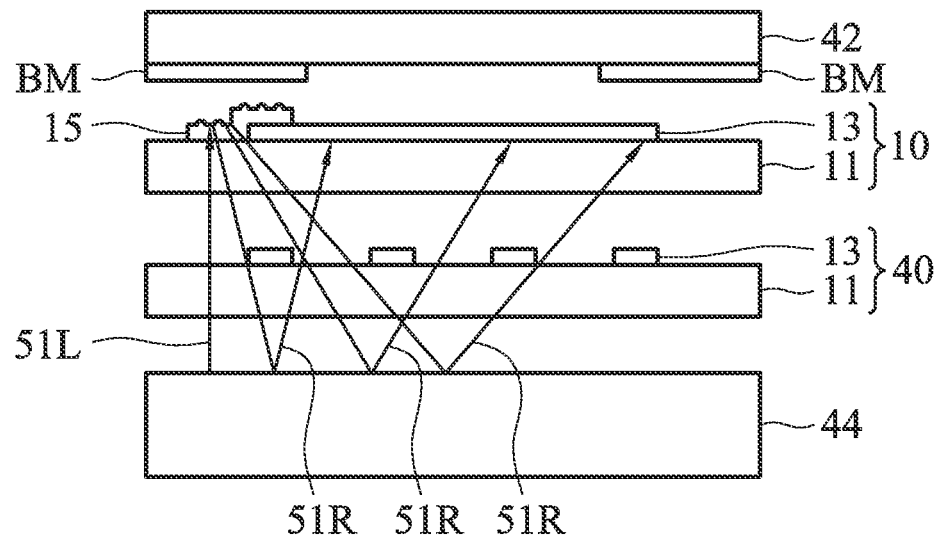
FIG. 5A shows a reflection effect of the trace for a light from the display device in one embodiment of the disclosure.
Figure 5B:
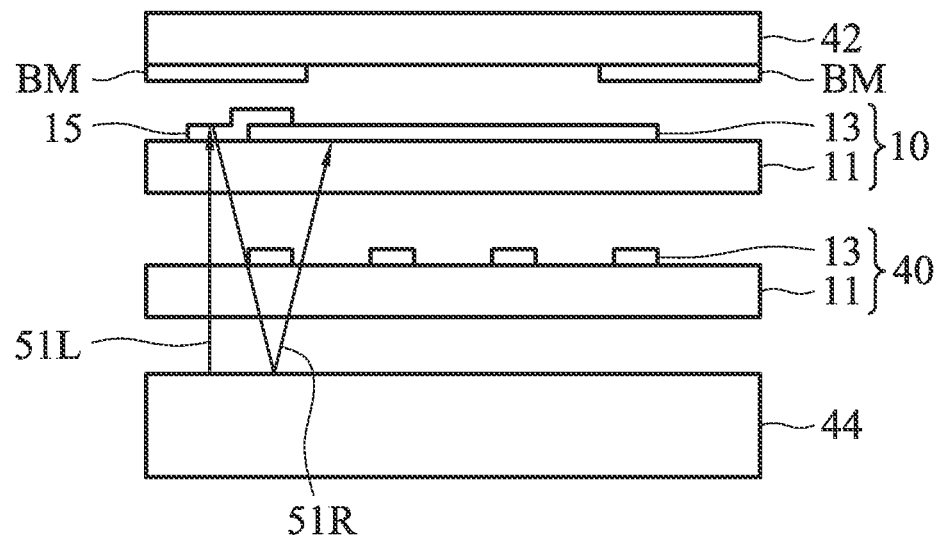
FIG. 5B shows a reflection effect of the trace for a light from the display device in one comparative embodiment of the disclosure.

FIG. 5A is illustrated on the basis of the touch display apparatus in FIG. 4A, and it should be understood that the touch display apparatus in FIG. 4B has a similar phenomenon. While the light 51 L emitted by the display device 44 exposes the traces 15, a part of the light may travel through the traces 15 and then be reflected by the surface of the traces to form the reflection light 51R due to the thinness of the traces 15. The reflection light 51R may travel back to and then re-reflected by the surface of the display device 44, thereby traveling through the substrate 11 and toward outside of the touch display apparatus. Because the mesh pattern is formed on the surface of the traces 15, the reflection light 51R will be a diffuse reflection other than focus on one point, thereby preventing the images from having uneven brightness. If the traces 15 have a flat surface other than the mesh pattern, the light 51L exposing to the traces 15 will be reflected to produce a reflection light 51R focused on one point. As such, the image will have uneven brightness as shown in FIG. 5B.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch display apparatus, comprising:
a display panel;
a first substrate disposed above the display panel, wherein the first substrate includes a touch-sensing region and a non-touch-sensing region; and
a first touch-sensing layer disposed above the first substrate;
wherein the first touch-sensing layer includes a first trace and a sensing electrode, a part of the first trace is disposed above the non-touch-sensing region, and a mesh pattern is formed on a surface of the first trace, the sensing electrode is disposed above the touch-sensing region, and the first trace is electrically connected to the sensing electrode, wherein the first trace includes a connection part overlapping and contacting a part of the sensing electrode, and roughness of a contact surface at an edge of the connection part is greater than roughness of an edge of the sensing electrode.

2. The touch display apparatus as claimed in claim 1, wherein the first substrate includes a polymer thin film.

3. The touch display apparatus as claimed in claim 1, wherein the mesh pattern includes at least one protrusion and at least two concaves, and the protrusion is disposed between the concaves.

4. The touch display apparatus as claimed in claim 3, wherein the concaves have a shape of circle, ellipse, or polygon.

5. The touch display apparatus as claimed in claim 1, wherein the mesh pattern includes a plurality of protrusions and a plurality of concaves, and a total area of the concaves is greater than a total area of the protrusions.

6. The touch display apparatus as claimed in claim 1, wherein the mesh pattern has a reflection pattern corresponding to an incident light, the reflection pattern includes at least one bright region and at least two dark regions, and the bright region is disposed between the dark regions.

7. The touch display apparatus as claimed in claim 1, wherein the mesh pattern has a reflection pattern corresponding to an incident light, the reflection pattern includes a plurality of bright regions and a plurality of dark regions, and a total area of the dark regions is greater than a total area of the bright regions.

8. The touch display apparatus as claimed in claim 1, wherein the first trace includes a body part extending along a length direction of the first trace, and a neck part connecting the body part and the connection part, wherein the connection part has a first width parallel to the length direction of the first trace, the neck part has a second width parallel to the length direction of the first trace, and the first width is greater than the second width.

9. The touch display apparatus as claimed in claim 8, wherein roughness of a contact surface at an edge of the body part is greater than roughness of the contact surface at the edge of the connection part.

10. The touch display apparatus as claimed in claim 1, wherein the mesh pattern of the first trace includes a plurality of protrusions, and an orientation of the protrusion is different from a length direction of the first trace.

11. The touch display apparatus as claimed in claim 1, further comprising a cover disposed over the touch display apparatus, and the cover includes a black matrix corresponding to the first trace.

12. The touch display apparatus as claimed in claim 11, further comprising a second substrate and a second touch-sensing layer sequentially disposed above the first touch-sensing layer, and disposed between the first touch-sensing layer and the cover.

13. The touch display apparatus as claimed in claim 1, further comprising a second touch-sensing layer disposed between the first substrate and the display panel.

* * * * *